United States Patent
Li et al.

(10) Patent No.: US 10,647,875 B2
(45) Date of Patent: May 12, 2020

(54) COATING COMPOSITIONS WITH IMPROVED DURABILITIES, COATINGS LAYERS AND PREPARING METHOD THEREOF

(71) Applicant: HEWLETT-PACKARD DEVELOPMENT COMPANY, L.P., Houston, TX (US)

(72) Inventors: Yong-Jun Li, Shanghai (CN); Steven Zhu, Chongqing (CN); Army Zhang, Shanghai (CN); Herbert Liu, Shanghai (CN)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/757,386

(22) PCT Filed: Oct. 21, 2015

(86) PCT No.: PCT/CN2015/092399
§ 371 (c)(1),
(2) Date: Mar. 5, 2018

(87) PCT Pub. No.: WO2017/066933
PCT Pub. Date: Apr. 27, 2017

(65) Prior Publication Data
US 2018/0265734 A1    Sep. 20, 2018

(51) Int. Cl.
| | |
|---|---|
| *B05D 3/02* | (2006.01) |
| *B05D 3/12* | (2006.01) |
| *B05D 1/02* | (2006.01) |
| *C09D 133/04* | (2006.01) |
| *C09D 133/06* | (2006.01) |
| *C09D 163/00* | (2006.01) |
| *C08G 59/40* | (2006.01) |
| *C08G 59/50* | (2006.01) |
| *C08G 59/68* | (2006.01) |
| *B32B 15/082* | (2006.01) |
| *B32B 15/092* | (2006.01) |
| *B32B 27/26* | (2006.01) |
| *B32B 27/30* | (2006.01) |
| *B32B 27/38* | (2006.01) |
| *B05D 7/14* | (2006.01) |
| *C08L 33/06* | (2006.01) |
| *C08L 63/00* | (2006.01) |

(52) U.S. Cl.
CPC ....... *C09D 163/00* (2013.01); *C08G 59/4028* (2013.01); *C08G 59/5086* (2013.01); *C08G 59/688* (2013.01); *C09D 133/06* (2013.01); *B05D 7/14* (2013.01); *C08L 33/06* (2013.01); *C08L 63/00* (2013.01); *C08L 2205/05* (2013.01)

(58) Field of Classification Search
None
See application file for complete search history.

(56) References Cited

U.S. PATENT DOCUMENTS

| | | | |
|---|---|---|---|
| 4,230,507 A | 10/1980 | Obayashi et al. | |
| 7,056,445 B2 | 6/2006 | Kimura et al. | |
| 8,501,301 B2 | 8/2013 | Okuda et al. | |
| 9,090,732 B2 * | 7/2015 | Poppe | C08G 18/2063 |
| 2002/0082351 A1 * | 6/2002 | Lewin | B05D 3/0209 525/123 |
| 2005/0210756 A1 | 9/2005 | Wei et al. | |
| 2013/0122307 A1 * | 5/2013 | Grabbe | B05D 3/0254 428/413 |

FOREIGN PATENT DOCUMENTS

JP     2011230311 A * 11/2011 ........... B32B 15/092

OTHER PUBLICATIONS

"Custon Pressure Metal/Magnesium Die Casting Parts for Laptops", Jan. 9, 2014.

* cited by examiner

*Primary Examiner* — Michael J Feely
(74) *Attorney, Agent, or Firm* — HPI Patent Department

(57) ABSTRACT

Provided is a thermally curable coating composition for alloy substrates, comprising: curable components, comprising an epoxy resin and a multifunctional (meth)acrylate; latent curing agents, which crosslink with the curable components upon heating, and comprise an isocyanate having at least two NCO groups and an amino resin; a curing promoter, comprising an aromatic phosphate comprising at least one hydroxy group connected with the phosphorous atom; and an organic solvent. Also provided are a method for providing a coating layer onto an alloy substrate and a coating layer thus obtained.

17 Claims, 1 Drawing Sheet

COATING COMPOSITIONS WITH IMPROVED DURABILITIES, COATINGS LAYERS AND PREPARING METHOD THEREOF

BACKGROUND

Alloys are useful in various applications owing to their special characteristics. Alloy structural parts are generally prepared by die-casting or thixo molding. For alloys structural parts containing at least two metals materials, since different metals may have different shrinkages, defects (such as sink marks, shadows, pinholes, blowholes etc.) inevitably appear on the surfaces of the alloys structural parts after die-casting or thixo molding. Some suppliers rework the defective alloy structural parts surfaces by repeatedly applying coatings thereon and polishing the coated alloys structural parts for several cycles, for example, for four or five cycles,

BRIEF DESCRIPTION OF DRAWINGS

Additional features and advantages of the disclosure will be apparent from the detailed description which follows, taken in conjunction with the accompanying drawings, which together illustrate, by way of example, features of the technology; and, wherein.

Figure 1:
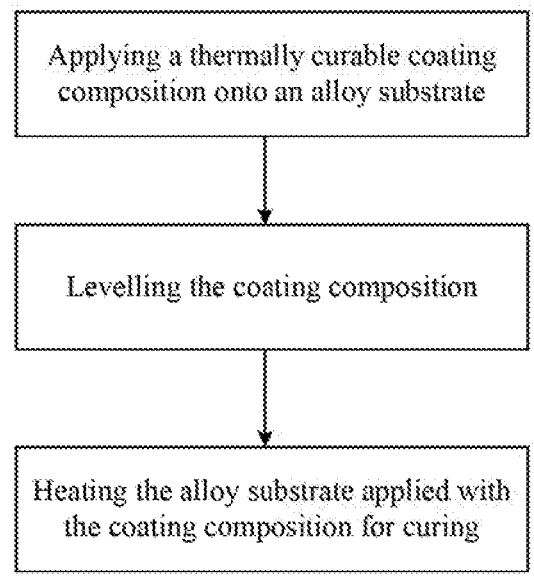
FIG. 1 is a flow chart illustrating a method for providing a coating layer onto an alloy substrate in accordance with an example of the present disclosure.

Reference will now be made to some illustrative examples, and specific language will be used herein to describe the same. It will nevertheless be understood that no limitation of the scope of the disclosure is thereby intended.

DETAILED DESCRIPTION

It has been discovered that the thermally curable coating compositions of the present disclosure make it possible to well mask the sink marks or shadows on the alloy surfaces, uniformly fill the recesses (such as pinholes and blowholes) on the alloy surfaces so as to obtain alloy parts having flat and smooth surfaces, and thus reduce the rework times and improve the first pass yield rates. In addition, the coating layers obtained from the thermally curable coating compositions of the present disclosure have good adhesive forces with the alloy substrates, and also possess excellent abrasion resistance, hardness and durability. Furthermore, comparing with powder coatings which are associated with potential risks of dust explosion, the coating compositions of the present disclosure are in liquid state and may exhibit a higher safety.

As used herein, the terms "thermal-curable coating composition" and "coating composition" may be used interchangeably.

In some examples, the thermally curable coating composition for alloy substrates comprises;

curable components, comprising an epoxy resin and a multifunctional (meth)acrylate, latent curing agents, which crosslink with the curable components upon heating, and comprise an isocyanate having at least two NCO groups and an amino resin, a curing promoter, comprising an aromatic phosphate comprising at least one hydroxy group connected with the phosphorous atom, and an organic solvent.

In some examples, the coating composition may further comprise a pigment.

In some examples, the coating composition may comprise:

10 to 30 weight parts of the epoxy resin,
10 to 30 weight parts of the multifunctional (meth)acrylate,
1 to 10 weight parts of the isocyanate having at least two NCO groups,
15 to 35 weight parts of the amino resin,
1 to 10 weight parts of the aromatic phosphate comprising at least one hydroxy group connected with the phosphorous atom,
10 to 50 weight parts of the organic solvent, and
0 to 10 weight parts of a pigment.

In the context of the present invention, the term "epoxy resin" refers to an organic compound containing at least two epoxy groups per molecule. The epoxy groups may be located at the end or in the middle of a linear molecular chain. The epoxy groups may also exist in a ring structure. Although not intended to be bound by theories, it is presumed that upon heating, the epoxy groups may crosslink with both the isocyanate component and the amino resin component described later, and form three-dimensional networks that are not soluble in water.

Examples of suitable epoxy resins include polyglycidyl ethers of polyphenols, polyglycidyl ethers of aliphatic polyols, polyglycidyl esters of aliphatic polyacids, and polyglycidyl esters of aromatic polyacids, and mixtures thereof. For example, the polyglycidyl ethers of polyphenols may be liquid bisphenol-A epoxy resins available under the trade names of NPSN-134X80, NPSN-134X85, NPSN-134X90 and NPSN-136X80 from Nanya Company, Taiwan.

In some examples, the epoxy resin may be in a liquid state.

In some examples, the epoxy resin may have a epoxy equivalent ranging from 200 to 350 eq/g. For example, the epoxy resins may have a epoxy equivalent of from 230 to 270 eq/g or from 300 to 330 eq/g.

In some examples, the epoxy resins may have a Brookfield viscosity ranging from 500 cps to 40000 cps at 25° C. measured according to ASTM D1084-1997. For example, the epoxy resin may have a Brookfield viscosity of 800 cps to 1400 cps, 3000 cps to 7000 cps, 2000 cps to 5000 cps or 10000 cps to 30000 cps at 25° C.

Although not intended to be bound by theories, it is presumed that upon heating, the multifunctional (meth)acrylates may also crosslink with both the isocyanate component and the amino resin component described later, thus improving the curing rate of the whole coating composition, imparting a good viscosity to the coating composition, and contributing to the excellent properties of the final coating layer, including adhesive forces, abrasion resistances, hardness, durability and leveling performances.

The term "(meth)acrylate" includes both "acrylate" and "methacrylate". The term "multifunctional (meth)acrylate" means a (meth)acrylate having at least two polymerizable (meth)acrylate moieties per molecule.

Examples of suitable multifunctional (meth)acrylates include diacrylates, such as diethylene glycol diacrylate, 1,6-hexanediol diacrylate, neopentyl glycol diacrylate, propoxylated neopentyl glycol diacrylate, tetraethylene glycol diacrylate, triethylene glycol diacrylate, and tripropylene glycol diacrylate; triacrylates, such as trimethylolpropane triacrylate, ethoxylated trimethylolpropane triacrylate, propoxylated glyceryl triacrylate and pentaerythritol triacrylate; tetra-acrylates, such as pentaerythritol tetra-acrylate; (meth)acrylates having five or more polymerizable (meth) acrylate moieties per molecule, and any combinations thereof.

In some examples, the multifunctional (meth)acrylate may be in a liquid state.

Hereinafter, the term "isocyanate having at least two NCO groups" is abbreviated as "isocyanate". The isocyanate may serve as a latent curing agent, which crosslinks with the epoxy resin component and multifunctional (meth)acrylate component upon heating to form three-dimensional networks, and contributes to a rapid curing rate. The coating composition containing an isocyanate having at least two NCO group may well mask and fill surface defects of alloy substrates, and the resultant coating layer is easy to be polished in subsequent procedures, if any.

The term "latent curing agent" as used herein refers to a curing agent that is relatively unreactive at room temperature and reactive upon heating. For example, upon heating at a temperature ranging from about 145° C. to 180° C., the isocyanates having at least two NCO groups may crosslink with the aforementioned epoxy resin component and multifunctional (meth)acrylate component. The term "room temperature" herein means about 25° C.

In some examples, isocyanates suitable for the present disclosure include aliphatic or aromatic diisocyanates, such as 1,6-hexamethylene diisocyanate (HDI), 1-isocyanato-3,3,5-trimethyl-5-isocyanatomethylcyclohexane (IPDI), xylylene diisocyanate (XDI), tetramethylxylylene diisocyanate (TMXDI), 2,4- or 2,6-toluylene diisocyanate (TDI), 2,4-diphenylmethane diisocyanate, 2,2-diphenylmethane diisocyanate, or 4,4-diphenylmethane diisocyanate (MDI), as well as isomer mixtures thereof, cyclohexyl diisocyanate (CHDI), hexahydroxylylene diisocyanate (HXDI), m-xylylene diisocyanate (XDI), naphthalene diisocyanate (NDI), or bitoluylene diisocyanate (TODI); aliphatic or aromatic triisocyanates and isocyanates having four or more NCO groups per molecule; and any combinations thereof.

In some examples, the isocyanate may be in a liquid state.

Although not intended to be bound by theories, it is presumed that the amino resin may also serve as a latent curing agent, which accelerates the curing rate of the whole coating composition upon heating.

In some examples, the amino resin may be selected from the group consisting of melamine and its deratives. In some examples, the amino resin may be alkylated melamine resins, wherein the alkyl groups in the alkylated melamine resins may independently have 1 to 10 carbon atoms. In some examples, the amino resin may be a methylated melamine resin, such as hexakis(methoxymethyl)melamine; an ethylated melamine resins, a propylated melamine resins, and their combinations.

In some examples, the amino resin may be in a liquid state.

Hereinafter, the term "aromatic phosphate comprising at least one hydroxy group connected with the phosphorous atom" is abbreviated as "aromatic phosphate". The aromatic phosphate may serve as a curing promoter. In some examples, the aromatic phosphate has an acidic pH value owning to the presence of the at least one free hydroxy group connected with the phosphorous atom. Since the aromatic phosphate has at least one free hydroxy group connected with the phosphorous atom, the free hydroxy group may chelate with the alloy substrate so as to improve the adhesive force of the cured coating layer with the alloy substrate. In addition, the aromatic phosphate may accelerate the curing rate of the whole coating composition, help to impart an excellent hardness, abrasion resistance and durability to the cured coating layer.

In some examples, useful aromatic phosphates may be a phosphate of alkoxylated phenol, including a phosphate of ethoxylated phenol, a phosphate of propoxylated phenol, a phosphate of ethoxylated naphthol, a phosphate of propoxylated naphthol, and their combinations. In some examples, the aromatic phosphate may be 2-phenoxyethyl phosphate (CAS No.: 39464-70-5).

In some examples, the aromatic phosphate may be in a liquid state.

In some examples, the organic solvent may be an aromatic hydrocarbon, including monoaromatic hydrocarbons and aromatic hydrocarbons containing at least two condensed benzene rings. In some examples, the organic solvent may be benzene, toluene, xylene, naphthalene or the like.

In some examples, the coating composition of the present disclosure may also comprise a pigment, so as to provide a desirable color, and also help to uniformly fill the recesses on the alloy substrates and well mask the sink marks or shadows on the alloy surfaces. Useful pigments may include inorganic pigments and organic pigments. In some examples, the pigment may be calcium carbonate, barium sulfate, sodium carbonate, magnesium carbonate, magnesium sulfate, barium carbonate, kaolin, talc, carbon black, calcium oxide, magnesium oxide, aluminum hydroxide, titanium dioxide, and mixtures thereof. The pigment may be powders, and their sizes are not specifically limited.

The coating composition of the present disclosure may also comprise additives other than the aforementioned components, such as plasticizers, preservatives and so on.

In some examples, the coating composition may be a clear solution.

In some examples, the coating composition may have a dynamic viscosity of 5500 to 8500 Pa·S, measured according to ASTM D445 by using a 7# spindle. In some examples, the coating composition may have a dynamic viscosity of 6500 Pa·S to 7500 Pa·S, such as 7200 Pa·S. When the dynamic viscosity of the coating composition is equal to or larger than $500 Pa·S, the coating composition is easy to form a coating layer with desirable thickness. When the dynamic viscosity of the coating composition is equal to or less than 8500 Pa·S, the coating composition is easy to be atomized and thus facilitates the application of the coating composition by spraying gun, and the resultant coating layer also exhibits a good uniformity.

In some examples, the alloy substrate may be an alloy containing magnesium or an alloy containing aluminum. In some examples, the alloy substrate may be an alloy containing both magnesium and aluminum, such as Mg—Al alloy. Mg—Al alloys have light weights but strong characteristics, and thus have been widely used in many fields, for example, in laptops, for a number of years.

There is no specific limitation to the addition order of each component of the coating composition of the present disclosure. In some examples, the epoxy resin, the multifunctional (meth)acrylate and the pigment (if any) may be first added and mixed together, then the isocyanate, the amino resin and the aromatic phosphate may be incorporated into the mixture, and the organic solvent is finally added. The whole addition and mixing procedures may be conducted at room temperature, i.e., about 25° C., and may be accompanied by stirring. In some examples, a vertical stirrer may be used for mixing the components of the coating composition of the present disclosure. In some examples, the stirring speed may range from 300 rpm to 500 rpm, such as 300 rpm, 350 rpm, 400 rpm, 450 rpm and 500 rpm.

As shown in the flow chart of FIG. 1, in some examples, the method for providing a coating layer onto an alloy substrate comprises:

applying a thermally curable coating composition onto the alloy substrate, wherein the coating composition comprises:
an epoxy resin,
a multifunctional (meth)acrylate,
an isocyanate having at least two NCO groups,
an amino resin,
an aromatic phosphate comprising at least one hydroxy group connected with the phosphorous atom, and
an organic solvent;
levelling the coating composition; and
heating the alloy substrate applied with the coating composition for curing.

In some examples, the alloy substrate may be cleaned prior to applying the coating composition of the present disclosure thereon.

In some examples, before applying the coating composition of the present disclosure to the alloy substrate, a powder coating composition may be applied thereon in advance, so as to better fill the recesses on the surface of the alloy substrate.

In some examples, the alloy substrate having a coating layer thereon that is obtained from the coating composition according to the present disclosure may take a muddy appearance. Therefore, the coating composition according to the present disclosure may also be referred to as a "liquid mud".

In some examples, after curing, the alloy substrate with the coating layer thereon may be polished.

In some examples, the coating composition of the present disclosure may be applied onto the alloy substrate by spraying. In some examples, the coating composition is sprayed onto the alloy substrate by employing a spraying gun.

In some examples, the alloy substrate applied with the coating composition of the present disclosure may be baked, for example, by employing infrared or an oven.

Figure 2:
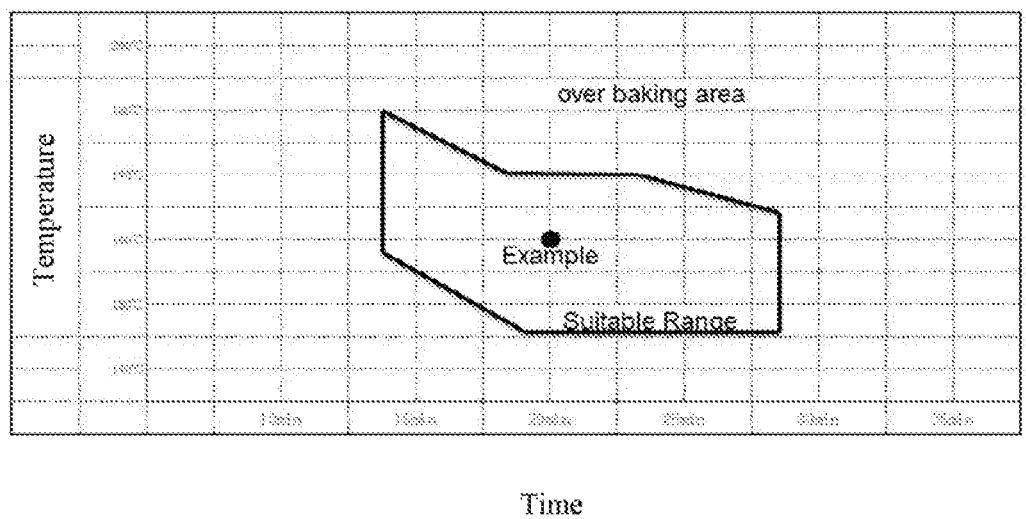
FIG. 2 shows a suitable temperature and time range for baking the alloy substrate with the coating composition applied thereon in accordance with an example of the present disclosure.

As shown in FIG. 2, in some examples, the alloy substrate with the coating composition applied thereon is baked at a temperature of from 145° C. to 180° C. for a period of 13 minutes to 29 minutes. The temperature and time range within the frame indicated in FIG. 2 may be considered as a "suitable range". In some examples, the the alloy substrate with the coating composition applied thereon is baked at 160° C. for 20 minutes to give a coating layer in the form of a film, which is marked as an illustrative example of the baking temperature and time in FIG. 2. A baking temperature no lower than 145° C. makes it possible for the coating composition to cure within a suitable time period, and a baking temperature no greater than 180° C. may prevent the final product from overbaking and deforming. A baking time no less than 13 minutes may allow the coating composition to cure sufficiently and to provide a excellent pencil hardness, and a baking time no greater than 29 minutes may prevent the final product from overbaking and deforming.

In some examples, the coating composition may be leveled at room temperature for 3 to 5 minutes.

In some examples, the coating layer of the present disclosure may have a dry thickness ranging from about 30 μm to 55 μm. In some examples, the coating layer of the present disclosure may have a dry thickness ranging from about 30 μm to 40 μm. A thickness equal to or greater than 30 μm is capable of sufficiently masking sink marks or shadows and filling recesses present on the surfaces of the alloy substrates, providing good abrasion resistance and protecting the alloy substrates from being destroyed. From the viewpoint of economy, a thickness may be equal to or less than 55 μm.

In some examples, the coating layer of the present disclosure may have a pencil hardness of 1H to 2H measured according to JIS K5600-5-4 (1999). A pencil hardness of 1H to 2H may provide sufficient protection to the alloy substrate, and may facilitates subsequent polishing procedure, if any.

To further illustrate the present disclosure, some examples are given herein. It is to be understood that these examples are provide for illustrative purposes and are not to be construed as limiting the scope of the present disclosure.

EXAMPLES

Materials

NPSN-134X85: Epoxy resin, available from Nanya Company, Taiwan (epoxy equivalent: 230 to 270 eq/g, Brookfield viscosity: 2000 cps to 5000 cps at 25° C.).

Trimethylolpropane triacrylate: multifunctional (meth) acrylate, available from Degussa.

2,2'-Diphenylmethane diisocyanate: isocyanate, available from BASF.

Hexakis(methoxymethyl)melamine: amino resin, available from Byer.

2-Phenoxyethyl phosphate: aromatic phosphate, available from BASF.

Example 1—Preparing the Coating Composition

The coating composition was manufactured as follows: 15 g NPSN-134X85, 15 g trimethylolpropane triacrylate and 2 g $TiO_2$ were mixed together in a vertical stirrer (R50, manufactured by Fluko) at room temperature for about 30 minutes. The stirring speed of the vertical stirrer was set to 500 rpm. Subsequently, 3 g 2,2'-diphenylmethane diisocyanate, 25 g hexakis(methoxymethyl)melamine and 5 g 2-phenoxyethyl phosphate were added to the resultant mixture while stirring at 500 rpm for about 30 minutes. Finally, 35 g xylene were added to the stirrer while stirring at 500 rpm for another 30 minutes. Obtained was a clear grey solution. The dynamic viscosity of the coating composition was 6800-7000 Pa·S at 25° C., measured according to ASTM D445 by using a 7# spindle.

Example 2. Comparative Example 1 and Comparative Example 2-Preparing the Coating Compositions Each coating composition of Example 2, Comparative Example 1 and Comparative Example 2 was prepared in the same way as described above for Example 1, except that the weight parts of each raw material vary according to Table 1 below. The dynamic viscosity of each coating composition was measured at 25° C. according to ASTM D445 by using a 7# spindle and recorded in Table 1.

TABLE 1

Formulations of the coating compositions

| Formulations Component | Raw Material | Weight parts | | | |
|---|---|---|---|---|---|
| | | Example 1 | Example 2 | Comparative Example 1 | Comparative Example 2 |
| Epoxy Resin | NPSN-134X85 | 15 | 25 | 20 | 20 |
| Multifunctional (meth)acrylate | Trimethylolpropane triacrylate | 15 | 25 | None | 25 |
| Isocyanate | 2,2'-Diphenylmethane diisocyanate | 3 | 6 | 5 | 5 |
| Amino resin | Hexakis(methoxymethyl)melamine | 25 | 20 | 30 | 25 |
| Aromatic phosphate | 2-Phenoxyethyl phosphate | 5 | 5 | 5 | None |
| Organic solvent | Xylene | 35 | 14 | 35 | 23 |
| Pigment | $TiO_2$ | 2 | 5 | 5 | 2 |
| | Dynamic viscosity (Pa · S) | 6800-7000 | 6800-7000 | 5000-5500 | 6800-7000 |

Providing the Coating Layers

Each of the coating compositions obtained in Examples 1 and 2, and Comparative Examples 1 and 2 was sprayed onto 30 pieces of Mg—Al alloy substrates (AZ91D, manufactured by Suzhou Yunhai Magnesium industrial Co., Ltd, China) at room temperature by using a spraying gun (W101, manufactured by IWATA). Then, the coated Mg—Al alloy substrates were leveled for 4 minutes. Subsequently, the coated Mg—Al alloy substrates were baked in an oven at 150° C. for 20 minutes. All the resultant coating layer samples, 30 pieces of replicate samples for each coating composition, have a dry thickness of about 45-50 1m.

Then, the coating layers obtained from each coating composition were evaluated for their performances in the following tests. Each test was conducted on 3 pieces of replicate coating layers, and the evaluation results of these three samples were averaged and recorded in Table 2 below.

Evaluation of the Masking and Leveling Performances

Each coating layer was visually inspected for its masking and leveling performances.

Evaluation of the Pencil Hardness

Each coating layer on the alloy substrate was subjected to a pencil hardness test according to JIS K5600-5-4 (1999). A series of pencils with the hardnesses ranging from 2H to F (manufactured by Mitsubishi Pencil Co., Ltd., Japan) were used, wherein the load was about 765 g, the measurement angle was about 45 degree, and the stroke length was 6.5 mm. Determination was made on the criterion whether scratches are recognized by visual inspection.

Evaluation of the Abrasion Resistance

The abrasion resistance of each coating layer on the alloy substrate was tested by using an RCA abrasion wear tester (KJD-7-IBB-CC, manufactured by Shenzhen ke jing da equipment co., LTD, China) in continuous mode with a 175 g load force for 50 cycles. Determination was made on the criterion whether the underlying Mg—Al alloy substrate was exposed by visual inspection.

Evaluation of the Adhesive Force

Each coating layer on the alloy substrate was subjected to the following adhesive force test. By using a cross cutter, the coating layer of 10×10 mm was divided into 10×10 sections while each of the 100 sections was provided with a width of about 1 mm, and a length of about 1 mm. Then, on the total of 100 sections, a strip of 3M scotch tape (600) was placed and closely adhered by hand. Next, the strip of 3M scotch tape was removed instantly from the 100 sections perpendicularly relative to the strip of 3M scotch tape. Then, by measuring the number of the square sections that remain on the coating layer, the adhesive force was evaluated.

Evaluation of the Durability

The durability of each coating layer on the alloy substrate was evaluated as below in terms of UV resistance, salt fog resistance, environmental accelerated life test and thermal shock test.

Evaluation of UV Resistance

Each coating layer on the alloy substrate was exposed to a UV-A light emitted by a UV lamp (ZN-P, manufactured by Maijie company, Shanghai, China) at 60° C. for 4 hours, wherein the UV wavelength emitted by the UV lamp was 340 nm, and the irradiance was 0.71 W/m$^2$/nm. Subsequently, the coating layer was heated in an oven at 50° C. for 4 hours. The UV exposure and heat exposure were alternately repeated for 50 cycles. The coating layer was then evaluated for its color change by visual inspection.

Evaluation of Salt Fog Resistance

The salt fog resistance of each coating layer on the alloy substrate was evaluated by using a salt fog test machine (LX-90, manufactured by Lianxiang company, Shenzhen, China) according to MIL-STD-81 OF standard at 35±2° C. A salt solution containing 5±1 weight % NaCl was sprayed to each coating layer for 24 hours, and dried for another 24 hours. Such spraying and drying cycle was repeated twice. That's to say, each coating layer was treated for 96 hours. Each coating layer was then evaluated for its loss by visual inspection.

Environmental Accelerated Life Test

Each coating layer on the alloy substrate was placed into a temperature and humidity control chamber (CX-G-80, manufactured by Changxu company, Shenzhen, China) at a constant temperature of 60° C. and releative humidity of 95% for about 96 hours. Each coating layer was then evaluated for its loss by visual inspection.

Thermal Shock Test

Each coating layer on the alloy substrate was placed into a temperature and humidity control chamber (CX-LR-80, manufactured by Changxu company, Shenzhen, China). The temperature of the temperature and humidity control chamber was set to a temperature of from −45° C. to −40° C. and kept for about 60 minutes, then the temperature was rapidly switched to a temperature of from 60° C. to 65° C. within 5 minutes. Then, the temperature was again quickly switched to from −45° C. to −40° C. within 5 minutes. Such temperature switch between the low temperature and the high temperature were repeated for 48 cycles, i.e. for about 96 hours (4 days). Each coating layer was then evaluated for its loss by visual inspection.

TABLE 2

Evaluation Results of the coating layer

| Performances of the coating layer | | Example 1 | Example 2 | Comparative Example 1 | Comparative Example 2 |
|---|---|---|---|---|---|
| Masking performance | | Good | Good | Good | Good |
| Leveling performance | | Uniform | Uniform | Jagged corner defects | Uniform |
| Pencil hardness | | 1H | 1H | F | 1H |
| Abrasion resistance | | Good | Good | Failure, with the alloy substrate exposed | Failure, with the alloy substrate exposed |
| Adhesive force | | 98% area remains | 99% area remains | 87% area remains | Less than 40% area remains |
| Durability | UV resistance | No discoloration | No discoloration | Turning black which represents severe discoloration | No discoloration |
| | Salt fog resistance | No blistering or peeling off | No blistering or peeling off | Blistering | about 20 area % of delamination |
| | Environmental accelerated life test | No blistering or peeling off | No blistering or peeling off | Blistering | Peeling off |
| | Thermal shock test | No blistering or peeling off cracks | No blistering or peeling off | Blistering | Peeling off |

It is clear from Tables 1 and 2 that the coating composition in Examples 1 and 2 had good dynamic viscosities. The coating layer obtained in Examples 1 and 2 well masked the sink marks or shadows and uniformly filled the recesses on the alloy substrate surfaces, and thus reduced the rework times and improved the first pass yield rates by 20% to 30%, which represents a potential of considerable cost saving for industrial production. In addition, the coating layers obtained from the thermally curable coating compositions of the present disclosure have good adhesive forces with the alloy substrates, and also possess excellent abrasion resistance, hardness and durability.

In contrast, the coating composition in Comparative Example 1 containing no multifunctional (meth)acrylate had a too low viscosity to form a good layer, and the obtained coating layer had jagged corers, which represents a poorer leveling property. The coating layer obtained in Comparative Example 1 exhibited a poorer hardness, abrasion resistance and adhesive force. In addition, the durability of the coating layer obtained in Comparative Example 1 was also worse.

The coating composition in Comparative Example 2 containing no aromatic phosphate showed a poorer abrasion resistance and a even worse adhesive force and durability, wherein the coating layer was easily peeled off or laminated. It was also observed that it took more than 30 minutes for the coating composition in Comparative Example 2 to cure, while the coating compositions in Examples 1 and 2 took about 8 minutes to cure.

While the disclosure has been described with reference to certain examples, those skilled in the art will appreciate that various modifications, changes, omissions, and substitutions can be made without departing from the spirit of the disclosure. It is intended, therefore, that the present disclosure be limited only by the scope of the following claims.

The invention claimed is:

1. A thermally curable coating composition for alloy substrates, comprising:
   curable components, comprising an epoxy resin and a multifunctional (meth)acrylate,
   latent curing agents, which crosslink with the curable components upon heating, and comprise an isocyanate having at least two NCO groups and an amino resin,
   a curing promoter, comprising 2-phenoxyethyl phosphate,
   an organic solvent, and
   a pigment.

2. The coating composition according to claim 1, wherein the coating composition has a dynamic viscosity of 5500 to 8500 Pa·S, measured according to ASTM D445 by using a 7# spindle.

3. The coating composition according to claim 1, wherein the epoxy resin has an epoxy equivalent from 200 to 350 eq/g.

4. A thermally curable coating composition for alloy substrates, comprising:
   curable components including from 10 to 30 weight parts of an epoxy resin and 10 to 30 weight parts of a multifunctional (meth)acrylate,
   latent curing agents, which crosslink with the curable components upon heating, including from 1 to 10 weight parts of an isocyanate having at least two NCO groups and from 15 to 35 weight parts of an amino resin,
   a curing promoter, including from 1 to 10 weight parts of an aromatic phosphate comprising at least one hydroxy group connected with a phosphorous atom,
   from 10 to 50 weight parts of an organic solvent, and
   from 0 to 10 weight parts of a pigment.

5. The coating composition according to claim 4, wherein the aromatic phosphate is a phosphate of alkoxylated phenol.

6. The coating composition according to claim 4, wherein the aromatic phosphate is 2-phenoxyethyl phosphate.

7. The coating composition according to claim 4, wherein the epoxy resin has an epoxy equivalent from 200 to 350 eq/g.

8. The coating composition according to claim 4, wherein the coating composition has a dynamic viscosity of 5500 to 8500 Pa·S, measured according to ASTM D445 by using a 7# spindle.

9. A method for providing a coating layer onto an alloy substrate, comprising:

applying a thermally curable coating composition onto the alloy substrate, wherein the coating composition comprises:
  curable components including from 10 to 30 weight parts of an epoxy resin and 10 to 30 weight parts of a multifunctional (meth)acrylate,
  latent curing agents, which crosslink with the curable components upon heating, including from 1 to 10 weight parts of an isocyanate having at least two NCO groups and from 15 to 35 weight parts of an amino resin,
  a curing promoter, including from 1 to 10 weight parts of an aromatic phosphate comprising at least one hydroxy group connected with a phosphorous atom, from 10 to 50 weight parts of an organic solvent, and from 0 to 10 weight parts of a pigment;
leveling the coating composition; and
heating the alloy substrate applied with the coating composition for curing.

10. The method according to claim 9, wherein the coating composition is applied onto the alloy substrate by spraying.

11. The method according to claim 9, wherein the coating composition is levelled at room temperature for 3 to 5 minutes.

12. The method according to claim 9, wherein the alloy substrate with the coating composition applied thereon is heated by baking at a temperature ranging from 145° C. to 180° C. for a period of 13 minutes to 29 minutes.

13. The method according to claim 9, wherein the alloy substrate is cleaned prior to applying the coating composition thereon.

14. The method according to claim 9, wherein the coating layer is polished after curing.

15. The method according to claim 9, wherein the coating layer has a dry thickness of 30 μm to 55 μm.

16. The method according to claim 15, wherein the coating layer has a pencil hardness of 1H to 2H measured according to JIS K5600-5-4 (1999).

17. The method according to claim 9, wherein the alloy substrate contains magnesium or aluminum, or contains both magnesium and aluminum.

* * * * *